UNITED STATES PATENT OFFICE.

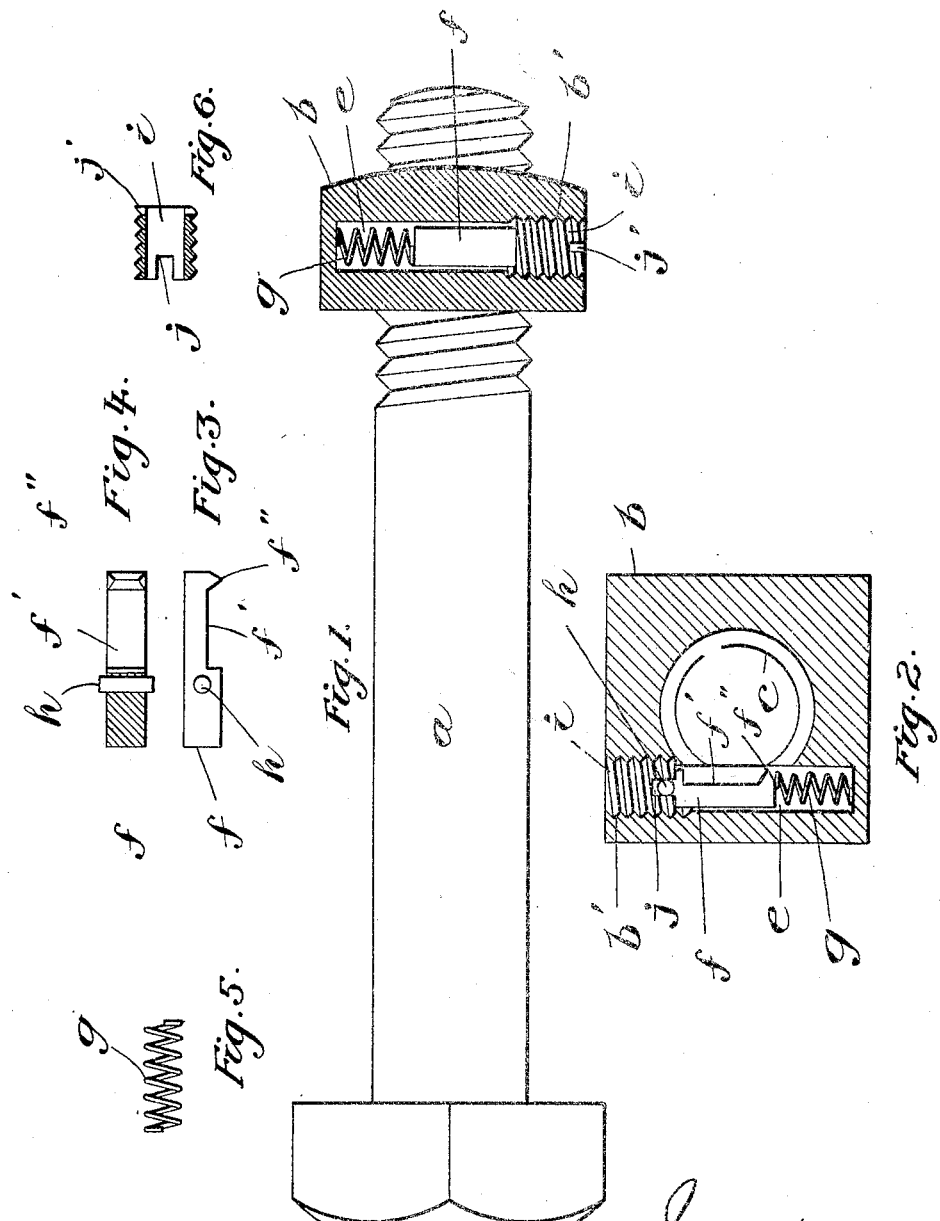

MILTON WARD WEBSTER, OF TORONTO, ONTARIO, CANADA.

NUT-LOCK.

1,367,648.　　　　Specification of Letters Patent.　　Patented Feb. 8, 1921.

Application filed May 20, 1920. Serial No. 382,935.

*To all whom it may concern:*

Be it known that I, MILTON WARD WEBSTER, a British subject, residing at the city of Toronto, in the county of York and Province of Ontario, Dominion of Canada, have invented a certain new and useful Improvement in Nut-Locks; and I hereby declare that the following is a full, clear, and exact description of the same.

This invention relates to a locking device for a nut, which will permit of the turning of the nut on the bolt in the on-direction, and prevent the turning of the nut in the off-direction until released for that purpose, and it consists essentially of forming the nut with a recess or cavity arranged transversely to the bore and communicating therewith, and providing this recess or cavity with a pin yieldingly held in engagement with the bolt threads as hereinafter set forth and particularly pointed out in the claims.

In the drawings:

Figure 1, is a sectional elevation showing the bolt, nut and locking device,

Fig. 2, is a sectional view on a larger scale than Fig. 1, of the nut and locking device, Fig. 3, is a plan view of the locking pin, Fig. 4, is a sectional elevational view of the pin shown in Fig. 3, Fig. 5, is a detail view of the spring, and Fig. 6, is a detail view of the nipple.

Like characters of reference refer to like parts throughout the specification and drawings.

$a$ represents a bolt of usual construction, and $b$ represents the nut therefor, having a threaded bore $c$, through which enters the threaded portion of the bolt.

Within the nut $b$ is a recess or cavity $e$, arranged transversely of the bore and communicating therewith. The recess or cavity is screw threaded for part of its way inward, as shown at $b'$. Within the recess or cavity $e$ is a locking pin $f$, having a cutaway part or clearance $f'$ opposed to the bore of the nut, and at the inner end of the pin is a tooth or retention member $f''$ projecting into the bore to a depth equal to that of the bolt threads.

Between the inner end of the locking pin and the inner end of the recess or cavity is a spring $g$ to yieldingly resist the inward movement of the pin and normally maintain the tooth or retention member in contact with the bolt threads.

Projecting laterally from the locking pin near its outer end are two studs $h$. Encircling the outer end of the locking pin is a hollow screw threaded nipple $i$, having at its inner extremity two slots $j$ to receive and bear against the studs $h$.

By screwing the nipple into the recess or cavity, the locking pin is forced inward and compresses the spring until the tooth or retention member is properly positioned within the bore and the clearance or cutaway part of the locking pin is opposed thereto. During the turning of the nut on the bolt the spring permits of the yielding of the locking pin in an inward direction, thus enabling the tooth or retention member to relieve the bolt threads of its pressure.

During the turning of the nut in the opposite direction, the spring forces the tooth or retention member into engagement with the bolt threads and prevents the turning of the nut in the off-direction.

The arrangement of the studs for the locking pin and the slots for the nipple, permits of the sliding movement of the locking pin without affecting the adjustment of the nipple during the screwing on of the nut, and they also provide for the clearance or cutaway part of the locking pin being brought into correct position with the bore of the nut during the turning of the nipple.

The nipple has a three-fold purpose; first, to offer an immovable resistance to the locking pin in an outward direction; second, to adjust the pin to bring the clearance and cutaway and the tooth or retention member into correct relation with the bore and third, to permit of the inward movement of the pin.

At the outer extremity of the nipple is a slot $j'$, for a screw driver, by which the nipple can be inserted in or removed from the cavity or recess. It is not necessary however, to confine the invention to a slot for that purpose as the nipple may be provided with other means within the scope of the appended claims for its removal or replacement.

To disengage the locking pin from the bolt threads for the separation of the nut from the bolt, a screw driver when pressed against the end of the locking pin forces it inward and displaces the studs from the slots. By a quarter turn of the nipple the slots are moved out of alinement with the studs, which are then engaged by the inner edge of the nipple, the latter being so adjusted as to hold the tooth or retention member clear of the bore of the nut.

Having thus fully described my invention, what I claim as new and desire to secure by Letters Patent is:

1. A nut having a threaded bore for the bolt and a recess arranged transversely of the bore and communicating therewith, in combination with a pin slidingly fitted within the recess engaging the threads of the bolt and provided with lateral projections, a spring yieldingly holding the pin in engagement with the bolt and a hollow nipple inserted in the recess bearing against the pin, and slotted to slidingly receive said projections.

2. A nut having a threaded bore for the bolt and a recess arranged transversely of the bore and communicating therewith, in combination with a pin provided with two lateral projections slidingly fitted within the recess clear of the bore, having a retention member engaging the threads of the bolt, a spring bearing against the inner end of the pin, yieldingly holding the retention member in engagement with the bolt, and a hollow nipple inserted in the bore bearing against the pin, and slotted to slidingly receive said projections.

3. A nut having a threaded bore for the bolt and a recess arranged transversely of the bore and communicating therewith, in combination with a pin slidingly fitted within the recess having a clearance for the bolt and provided with lateral projections, a retention member engaging the threads thereof, a spring bearing against the inner end of the pin and yieldingly holding the retention member in engagement with the bolt, and a hollow nipple inserted in the recess and bearing against the pin to compress the spring, and slotted to slidingly receive said projections.

Toronto, Ontario, Canada, May 5th, 1920.

MILTON WARD WEBSTER.

Signed in the presence of—
CHAS. H. RICHES,
W. J. GILCHRIST.